No. 879,992. PATENTED FEB. 25, 1908.
G. M. WILSON.
WAVE MOTOR.
APPLICATION FILED APR. 18, 1907.

2 SHEETS—SHEET 1.

Witnesses:

Inventor,
George M. Wilson.
by
Townsend Lyon Hackley Wright
His Attys

No. 879,992. PATENTED FEB. 25, 1908.
G. M. WILSON.
WAVE MOTOR.
APPLICATION FILED APR. 18, 1907.

2 SHEETS—SHEET 2.

Witnesses:

Inventor,
George M. Wilson.
by Townsend Hauhackly & Wright
His Attys.

UNITED STATES PATENT OFFICE.

GEORGE M. WILSON, OF LOS ANGELES, CALIFORNIA.

WAVE-MOTOR.

No. 879,992.     Specification of Letters Patent.     Patented Feb. 25, 1908.

Application filed April 18, 1907. Serial No. 369,008.

*To all whom it may concern:*

Be it known that I, GEORGE M. WILSON, a citizen of the United States, residing at Los Angeles, in the county of Los Angeles and State of California, have invented a new and useful Wave-Motor, of which the following is a specification.

This invention relates to wave motors, and the main object of the invention is to provide novel means for so mounting the machinery, not carried by the float proper, that it will automatically adjust itself to the tide and keep in proper relation to the float proper and yet be firmly supported in operative position at all times.

Other objects and advantages will be brought out in the following description.

Figure 1:
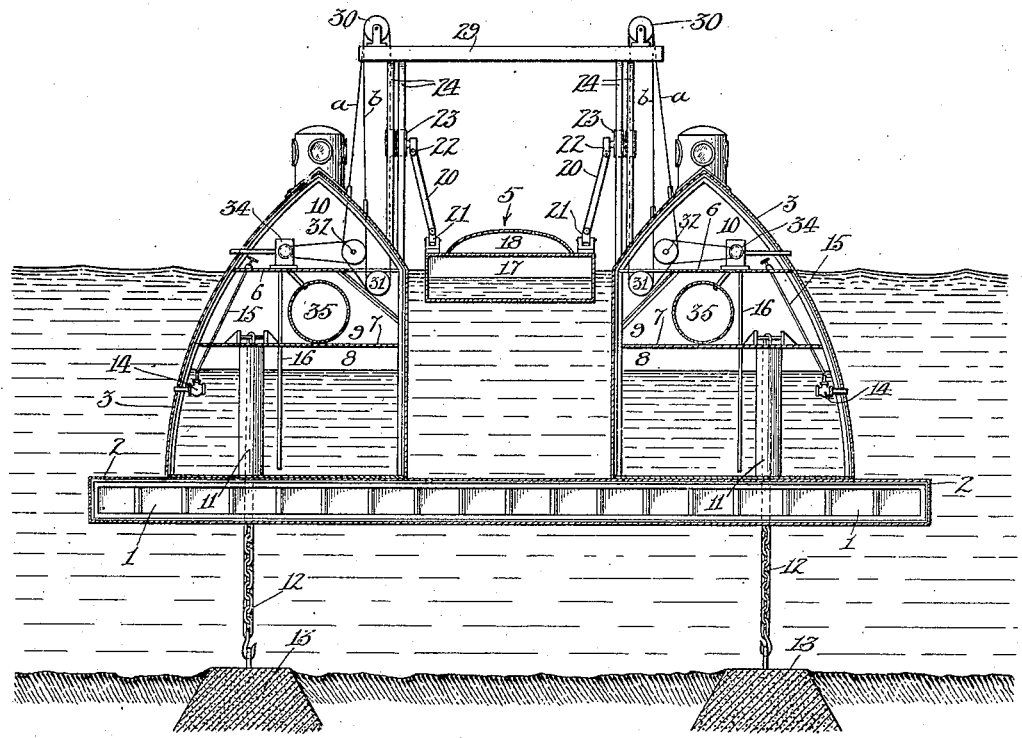
Figure 2:
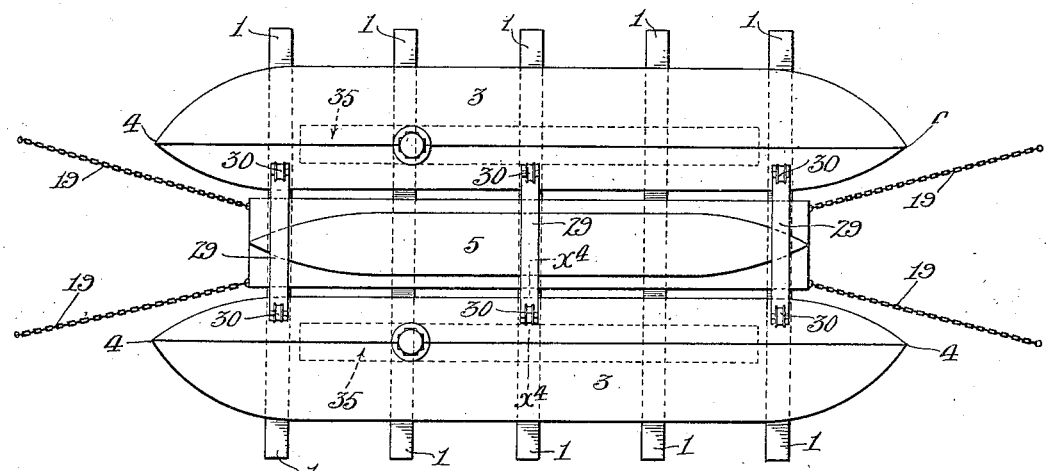
Figure 3:
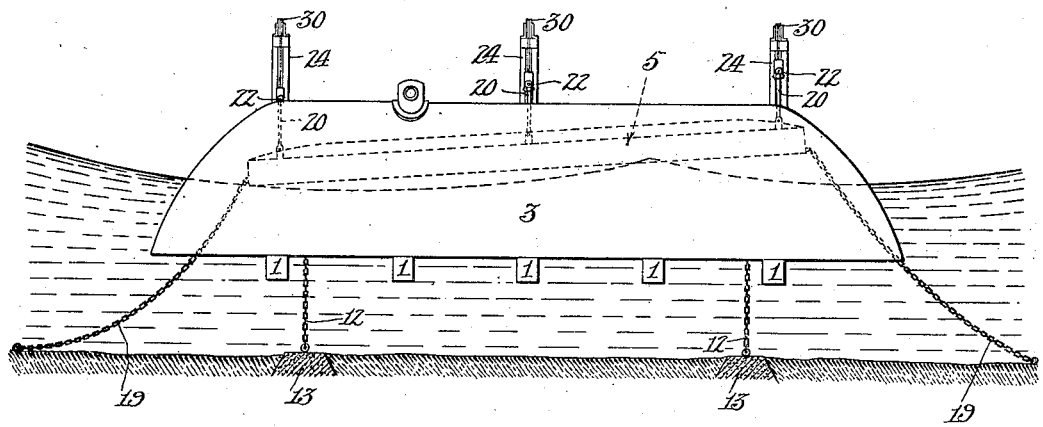
Figure 4:
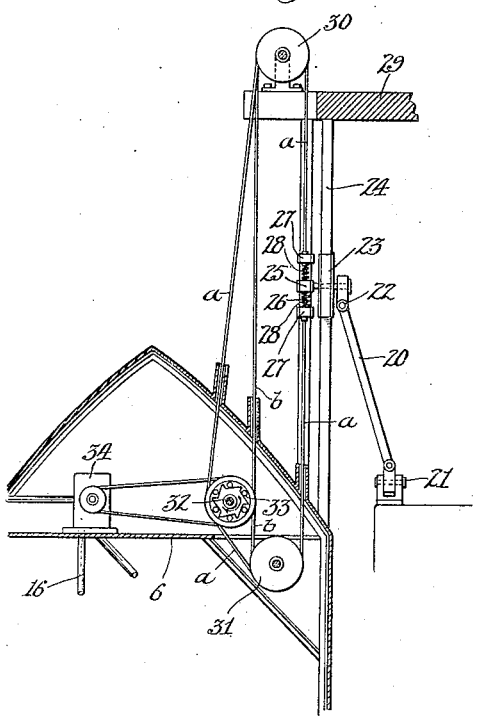
Figure 5:
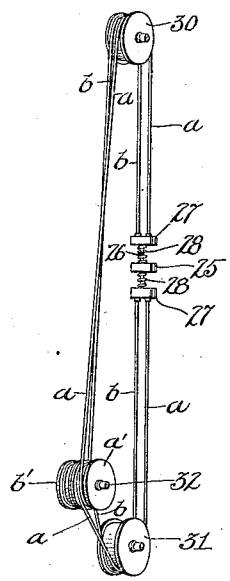

Referring to the drawings: Figure 1 is a vertical cross section through the complete apparatus. Fig. 2 is a plan view on a smaller scale. Fig. 3 is a side elevation of the apparatus, the anchors being shown in section. Fig. 4 is a detail view, partly in section, taken transversely on line $x^4$—$x^4$ Fig. 2. Fig. 5 is a perspective view of the cable portion of the transmitting mechanism of one side of the wave motor.

Briefly, the invention comprises a wave motor which is combined with a stable floating structure. Heretofore wave motors have been arranged to coöperate with stationary piers rising from the ocean bed, or with piles, and in such constructions it has been necessary to provide means for shifting the wave motor proper relatively to the piers or piles in order to maintain its proper relation to the waves on account of the tide. In the present invention, by mounting the wave motor on a stable floating structure instead of an immovable pier, all the advantages of a stationary pier are afforded without its disadvantages, in that the stable floating structure is immovable by wave or mere surface disturbance of the water, as the main portion of such structure is located far below the surface disturbance of the water and is steadied by the large body of still water underneath the surface and the structure is practically as immovable by mere surface action of the water as is a solid pier rising from the ocean bed. This combination is my invention in its broad aspect, and details of the wave motor or of the steady floating structure may be variously designed. The steady floating structure may comprise a series of horizontal steel girders 1, each of which may be covered with a casing 2. Mounted on the girders 1 is a pair of chambers 3 which rise above the surface of the water, the girders 1 and lower portions of the chambers 3 being located below the surface disturbance and surrounded by the still water. The chambers 3 at each end are curved to a cut-water 4, as shown, to split the waves and reduce shock on the upper portions of the chambers. The chambers 3 extend fore and aft, that is to say they extend in a general line with the wave motion and are spaced apart an ample distance to receive the barge or float 5 of the wave motor. Each chamber 3 is provided with bulkheads 6 and 7, thus forming three compartments 8, 9 and 10. Extending through the lower compartment 8 is a tube 11 through which a chain 12 is extended, the upper end of the chain being attached to the bulkhead 7, the lower end of the chain being anchored at 13 in the ocean bed. The lower chamber 8 constitutes a water ballast chamber whereby the steady floating structure may be raised or lowered in elevation by increasing or decreasing the amount of water contained therein, water being introduced to the chamber through a sea-cock 14 operated by a rod 15 which extends through the upper bulkhead 6, and water may be pumped from chamber 8 through a pipe 16.

The float 5 may be constructed with a lower water compartment 17 and an upper air chamber 18. By increasing or decreasing the amount of water in chamber 17 the float may be caused to ride high or low on the surface. Connected to each end of the float are cables 19 which extend to anchors and are for the purpose of guiding the float and keeping it in operative position between the chambers 3. As the waves move through between chambers 3, the float is actuated, thereby rising and falling with an undulating movement therewith, the power being taken from the float by means of cables. Three links 20 are connected by universal joints 21 to each side of the float, the links 20 at their upper ends being connected by universal joints 22 to cross heads 23, each cross head sliding between a pair of vertical ways 24. Each cross head carries a central abutment 25 through which extends a rod 26 carrying at each end an abutment 27, coil compression springs 28 being located between each head 27 and the central abutment 25 for cushioning the movement.

Mounted on each side of a superstructure 29 are three idle drums 30, and in line with the respective drums 30 below the line of the bulkhead 6 is a set of idle drums 31. Mounted above the bulkhead 6 are three pairs of drums, each pair comprising drums $a'$ and $b'$. Each drum $a'$ and $b'$ operates a shaft 32 through the medium of a roller clutch 33, the roller clutch 33 of one drum being shown in Fig. 4. Both roller clutches of each pair of drums $a'$ and $b'$ are arranged to act in the same direction on their common shaft 32. Connected to each upper abutment 27 is a cable $a$ which extends up over a drum 30, thence down and around its associated driving drum $a'$, thence around the lower associated idle drum 31, thence up to the lower abutment 27. A cable $b$ is connected to the upper abutment 27 and extends up over the upper drum 30, thence down and around the driving drum $b'$, being coiled therearound in a direction opposite to the cable $a$. From drum $b'$ cable $b$ extends over drum 31 in the same direction as cable $a$ and thence extends up and is connected to the lower abutment 27. Thus as the abutments 27 are reciprocated vertically, the cables $a$ and $b$ impart oscillatory motion to the respective drums $a'$ and $b'$ in opposite directions, and as one drum, for example $a'$, is oscillated in the direction of the arrow, Fig. 4, it drives the shaft 32 with it and at the same time drum $b'$ is being oscillated in the reverse direction and its roller clutch is recovering. This action takes place during the up stroke of the abutment 27. During the down stroke of the abutment 27 the cable $b$ rotates its drum $b'$ in the direction of the arrow shown in Fig. 4, and drives the shaft 32 during the recovery of the clutch of drum $a'$, and thus the shaft 32 has continuous motion imparted to it, being actuated by one clutch during the up stroke of the float and being actuated in the same direction by the other clutch during the down stroke of the float.

In the drawings I have shown power as being thus taken from the motor at six different points. Each shaft 32 may operate its individual mechanism, which mechanism may be of any desired type; for example, the shaft 32 may drive a pump 34.

Located in each central compartment 9 is a reservoir 35, into which water may be pumped by any of the pumps operated from the shafts 32 and the water from tanks 35 may be conducted to a water wheel, not shown. The pipe 16 before referred to may be connected to any of the pumps.

What I claim is:—

1. In combination a stable floating structure, a wave actuated float, power transmission mechanism intermediate the float and stable structure, and a shock absorbing device in said power transmitting mechanism.

2. In a wave motor, a stable floating structure, vertical guideways upon said structure, a cross head mounted to reciprocate upon said ways, said head comprising a central abutment, heads above and below the central abutment carried upon a rod, cushioning means between said head and central abutment, two cables, each connected at its end with one of said heads, a clutch connected with the intermediate portion of said cables, power transmitting mechanism connected with said clutch, and a wave actuated float for reciprocating the cross head.

3. In a wave motor, a stable floating structure having two parallel chambers, transverse girders supporting said chambers, bulkheads within the chambers forming upper, lower and intermediate compartments, said lower compartment constituting a water ballast compartment, and means within said upper compartment for varying the amount of ballast in said lower compartment.

4. In a wave motor, a stable floating structure having two parallel chambers, transverse girders supporting said chambers, bulkheads within the chambers forming upper, lower, and intermediate compartments, tubes extending from the intermediate compartment through the lower compartment, and anchor chains extending from the intermediate compartment through said tubes.

5. A stable floating structure having two parallel chambers, transverse girders supporting said chambers, bulkheads within said chambers forming upper, lower and intermediate compartments, pumps within the upper compartment, accumulators within the intermediate compartment, connections between said pumps and accumulators, a wave actuated float, and power transmission means between said float and pump.

In testimony whereof, I have hereunto set my hand at Los Angeles, California, this 10th day of April 1907.

GEORGE M. WILSON.

In presence of—
  GEORGE T. HACKLEY,
  ELMER C. PHIPPS.